US006557547B1

(12) United States Patent
MacIntosh

(10) Patent No.: US 6,557,547 B1
(45) Date of Patent: May 6, 2003

(54) PORTABLE COOKING APPARATUS

(75) Inventor: Ian Joseph MacIntosh, Toronto (CA)

(73) Assignee: Move Media Inc., Toronto (CA)

( * ) Notice: Subject to any disclaimer, the term of this patent is extended or adjusted under 35 U.S.C. 154(b) by 0 days.

(21) Appl. No.: 10/171,886

(22) Filed: Jun. 14, 2002

(51) Int. Cl.[7] .............................. A47G 23/04; F24C 1/16
(52) U.S. Cl. ....................... 126/41 R; 126/268; 126/276
(58) Field of Search .............................. 126/41 R, 39 B, 126/268, 265, 276; 296/22

(56) References Cited

U.S. PATENT DOCUMENTS

| 3,696,803 | A |   | 10/1972 | Holloway, Jr. |         |
|-----------|---|---|---------|---------------|---------|
| 3,991,739 | A | * | 11/1976 | Hoffman, Jr. ............... | 126/268 |
| D291,047  | S | * | 7/1987  | Pappas        |         |
| 4,686,958 | A | * | 8/1987  | Skelton et al. ........... | 126/369.2 |
| 4,757,755 | A | * | 7/1988  | Sarten ......................... | 99/357 |
| 5,031,602 | A |   | 7/1991  | Vick          |         |
| D334,687  | S |   | 4/1993  | Gongwer       |         |
| 5,255,664 | A |   | 10/1993 | Gurliacci     |         |
| 5,501,210 | A |   | 3/1996  | Van Hoogmoed  |         |
| D368,618  | S |   | 4/1996  | Van Hoogmoed  |         |
| 5,775,316 | A | * | 7/1998  | Jones ........................ | 126/41 R |
| D433,279  | S |   | 11/2000 | Schloser et al. |       |
| 6,240,915 | B1 |  | 6/2001  | Fletcher      |         |
| 6,308,616 | B1 | * | 10/2001 | Johnson ....................... | 99/339 |

* cited by examiner

*Primary Examiner*—Henry Bennett
*Assistant Examiner*—Alfred Basichas
(74) *Attorney, Agent, or Firm*—Bliss McGlynn, P.C.

(57) ABSTRACT

A portable cooking or barbequing apparatus includes a support frame having a front end with a tow hitch mechanism and ground engaging wheels mounted on opposite sides of the frame. A main housing is mounted on the frame and has vertically extending side walls and an open top. A plurality of smaller housing, each containing a gas burner, are fixedly mounted in the main housing. These smaller housings each have a bottom, vertically extending opposite side walls and opposite end walls connecting the side walls. A gas supply system provides fuel gas to the burners and a burner control system operates the gas burners and controls the flow of fuel gas to the burners. A main lid is preferably pivotally mounted on the main housing to cover its open top.

20 Claims, 7 Drawing Sheets

PORTABLE COOKING APPARATUS

BACKGROUND OF THE INVENTION

This invention relates to cooking apparatus and, in particular, portable cooking apparatus suitable for barbecuing outdoors and cooking apparatus employing fuel gas such as propane.

Mobile outdoor cooking apparatus including barbecue grilling devices are well known in the cooking and barbecuing industry. Such devices typically include a support frame on which ground engaging wheels are mounted and that can include a hitch mounted at a front end of the support frame for towing purposes. A plurality of cooking elements can be mounted on the frame together with a rechargable fuel tank for holding a fuel gas such as propane or liquified natural gas.

A known portable propane cooking trailer is that shown in U.S. Pat. No. 5,501,210 which issued Mar. 26, 1996 to A. P. Van Hoogmoed. This trailer has a frame with tandem mounted ground engaging wheels and a hitch at the front end for towing purposes. A first pair of cooking elements disposed back to back is located on a forward portion of the frame while a second pair of cooking elements disposed back to back is disposed on a rear portion of the frame. A large storage compartment is interposed between the from and rear pairs of cooking elements. A large fuel cylinder is provided with the cooking trailer and can be connected to the cooking elements by means of a long supply line. Because the cooking elements are disposed back to back, cooks who are using this cooking trailer carry out their cooking activities on both longitudinal sides of the cooking trailer.

Another mobile cooking apparatus mounted on wheels is shown in U.S. Pat. No. 5,255,664 issued Oct. 26, 1993 to D. E. Gurliacci. In this device, there is a single line of cooking stations arranged on one side of the trailer and a parallel line of serving stations arranged on the opposite side of the trailer. These two lines are separated by an upwardly extending smoke baffle and a trough to receive cooked food items. Each cooking station includes a stove that may be of the gas type and that has two burners for heating pans of oil that can be used for deep frying.

One difficulty with these known, relatively large cooking trailers is that they must generally be custom built using components and parts specially designed for the cooking units. The use of specially designed parts and cooking elements can add to the overall expense of the cooking trailer and tends to make them less competitive as compared to other types of cooking and grilling devices that could be used, for example a plurality of standard, relatively small barbecuing grills. Also, because these known cooking trailers tend to be custom built using their own, specially designed components and cooking units, the cost of obtaining government certification for these cooking trailers can be substantial and time consuming.

It is an object of the present invention to provide an improved cooking apparatus suitable for cooking food with a fuel gas that can be made at a relatively low cost and with relative ease using readily available cooking devices.

It is a further object of the present invention to provide a gas cooking apparatus that includes as its main components, a support frame, a main housing mounted on this support frame, and a plurality of separate cooking units mounted in the main housing, which cooking units can be of standard construction, if desired.

SUMMARY OF THE INVENTION

According to one aspect of the invention, a cooking apparatus for cooking food with a fuel gas such as propane includes a support arrangement for supporting the apparatus on the ground or other support surface and a main housing mounted on the support arrangement. The main housing includes main side walls that extend vertically. There are also a plurality of cooking units mounted in the main housing, each of these units comprising a smaller housing having an open top, at least one gas burner mounted in this smaller housing, and at least one grill member mounted on the smaller housing above the at least one gas burner. Each smaller housing has a bottom, vertically extending opposite side walls, and vertically extending, opposite end walls connecting the side walls. A gas supply system provides fuel gas to the burners.

According to another aspect of the invention, a movable gas cooking apparatus comprises a supporting frame having two opposite longitudinal sides, a front end and a rear end and ground engaging wheels rotatably mounted on opposite sides of the supporting frame. A housing is also provided, this housing including a lower section having vertically extending, opposing side walls, vertically extending, opposing end walls and an open top. The housing further includes a lid pivotable between open and closed positions and extending over the lower section. There are also a plurality of separate cooking units mounted in two longitudinal rows in the housing, all of these units being oriented so that a front side of each cooking unit faces towards the same side wall of the housing. Each cooking unit includes an open topped enclosure, at least one gas burner mounted in the enclosure, and at least one grill member mounted above the at least one gas burner. The apparatus further includes a gas supply system for providing a fuel gas to the burners.

Preferably the cooking units in one row, including their respective enclosures, are mounted at a higher level than the cooking units in enclosures in the other row, and the other row is located closest to the aforementioned same side wall of the housing.

According to a further aspect of the invention, a portable cooking apparatus includes a longitudinally extending support frame having a rear end and a front end and a tow hitch mechanism mounted on the front end. Ground engaging wheels are rotatably mounted on opposite longitudinal sides of the support frame. A main housing is provided and has vertically extending main side walls. This main housing is mounted on the support frame. There are also a plurality of smaller housings each containing at least one gas burner and each having a bottom, vertically extending opposite side walls, and vertically extending opposite end walls. Each smaller housing is provided with at least one grill member mounted above the at least one gas burner of the respective housing. The smaller housings are fixedly mounted in the main housing. The apparatus includes a gas supply system for providing fuel gas to the burners and a burner control system for operating the gas burners and controlling flow of the fuel gas to the gas burners.

Preferably the smaller housings are arranged in two longitudinally extending rows with at least two of the smaller housings in each row. A main hood is preferably mounted on the main housing and is pivotable between an open position used for cooking and a closed position. This main hood in the closed position covers the open top of the main housing.

Further features and advantages will become apparent from the following detailed description taken in conjunction with the accompanying drawings.

DETAILED DESCRIPTION OF PREFERRED EMBODIMENTS

Figure 1:
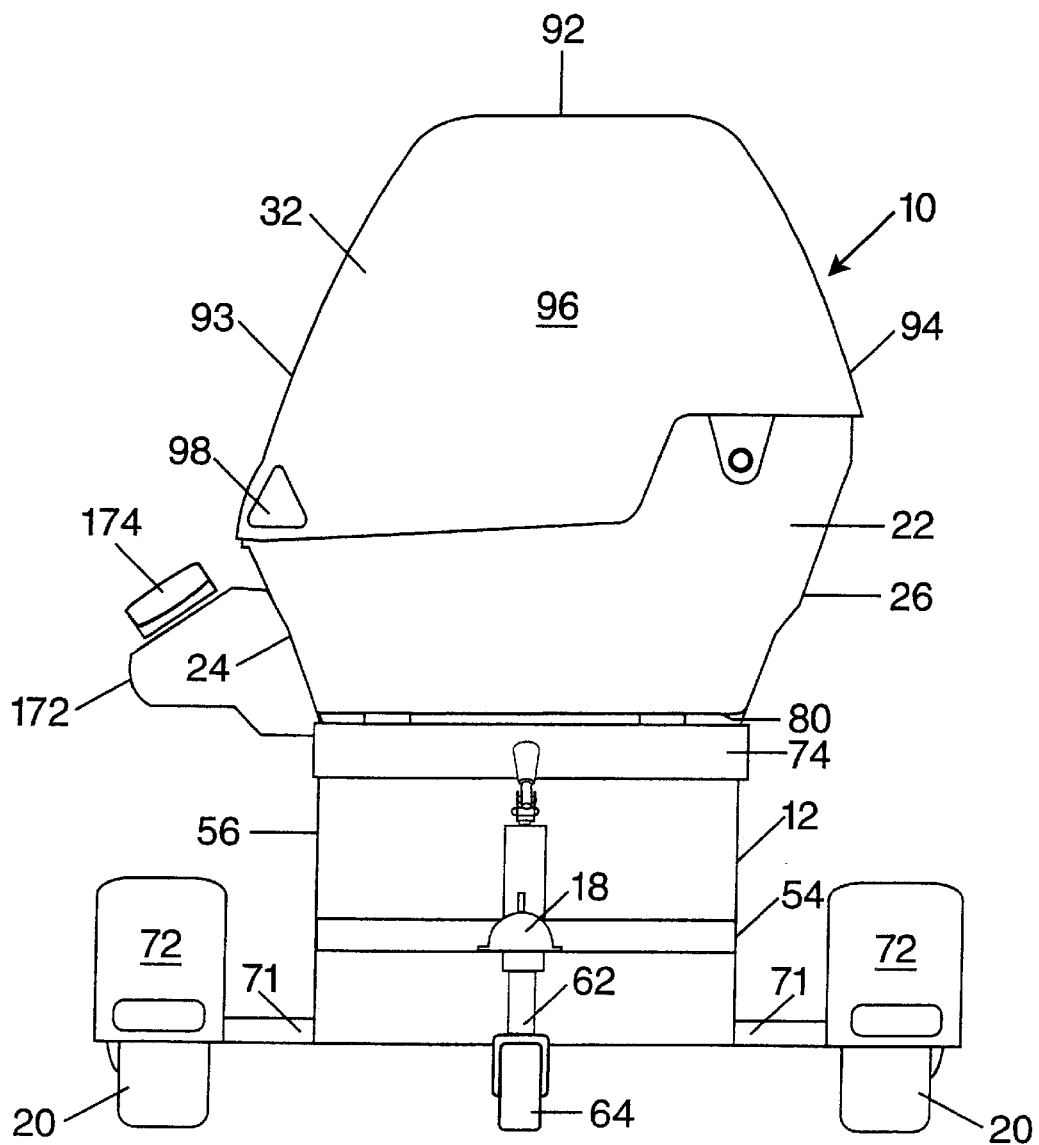
FIG. 1 is a front elevation of a portable cooking apparatus constructed in accordance with the invention.
Figure 2:
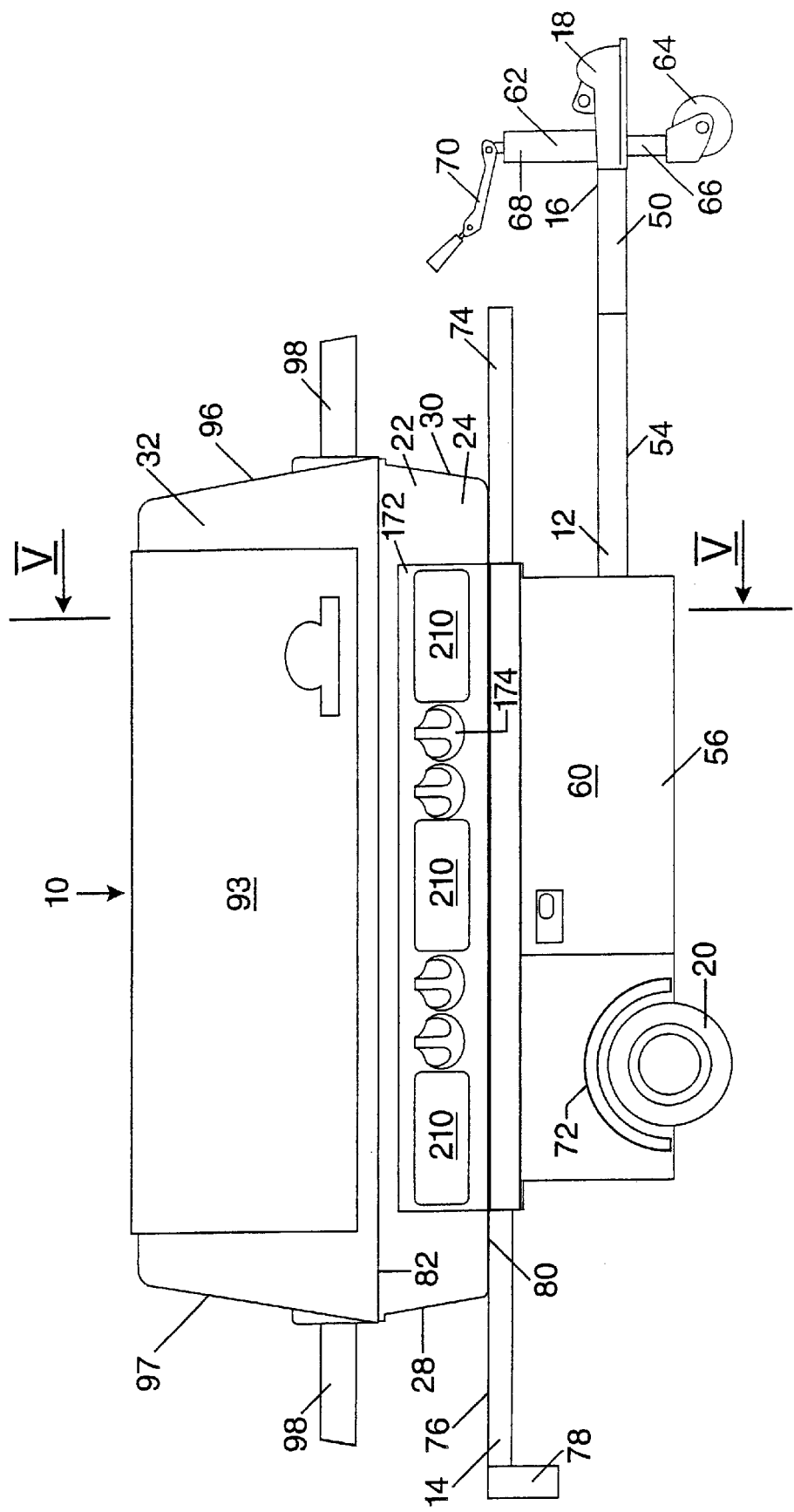
FIG. 2 is a right side elevation of the cooking apparatus of FIG. 1 with the hood of the main housing shown in the closed position.
Figure 3:
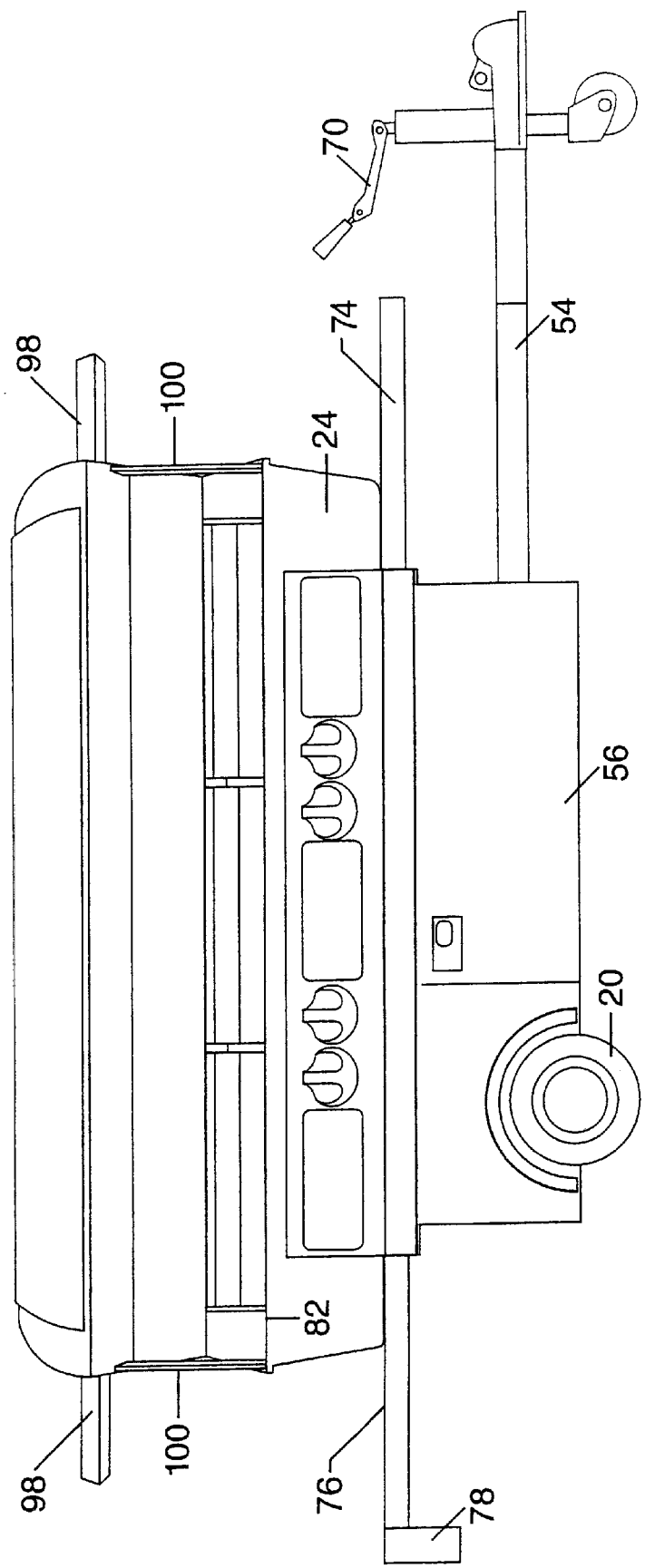
FIG. 3 is a right side elevation similar to FIG. 2 but showing the hood in the raised or open position.

A portable cooking apparatus or portable barbecue 10 constructed in accordance with the invention is illustrated in FIGS. 1 to 3. This apparatus includes, as main components, a longitudinally extending support frame 12 having a rear end 14 and a front end 16, a tow hitch mechanism 18 mounted on the front end, and two ground engaging wheels 20 mounted on opposite longitudinal sides of the support frame. The apparatus further includes a main housing 22 which is mounted on the support frame and which can be made from a suitable metal such as cast iron or steel. The main housing is provided with vertically extending main side walls 24, 26 and vertically extending end walls 28, 30 which connect the two side walls together. The lower section of the housing (without a main hood or lid 32) has an open top that permits cooking to be conducted in or on the housing as explained further hereinafter.

Figure 6:
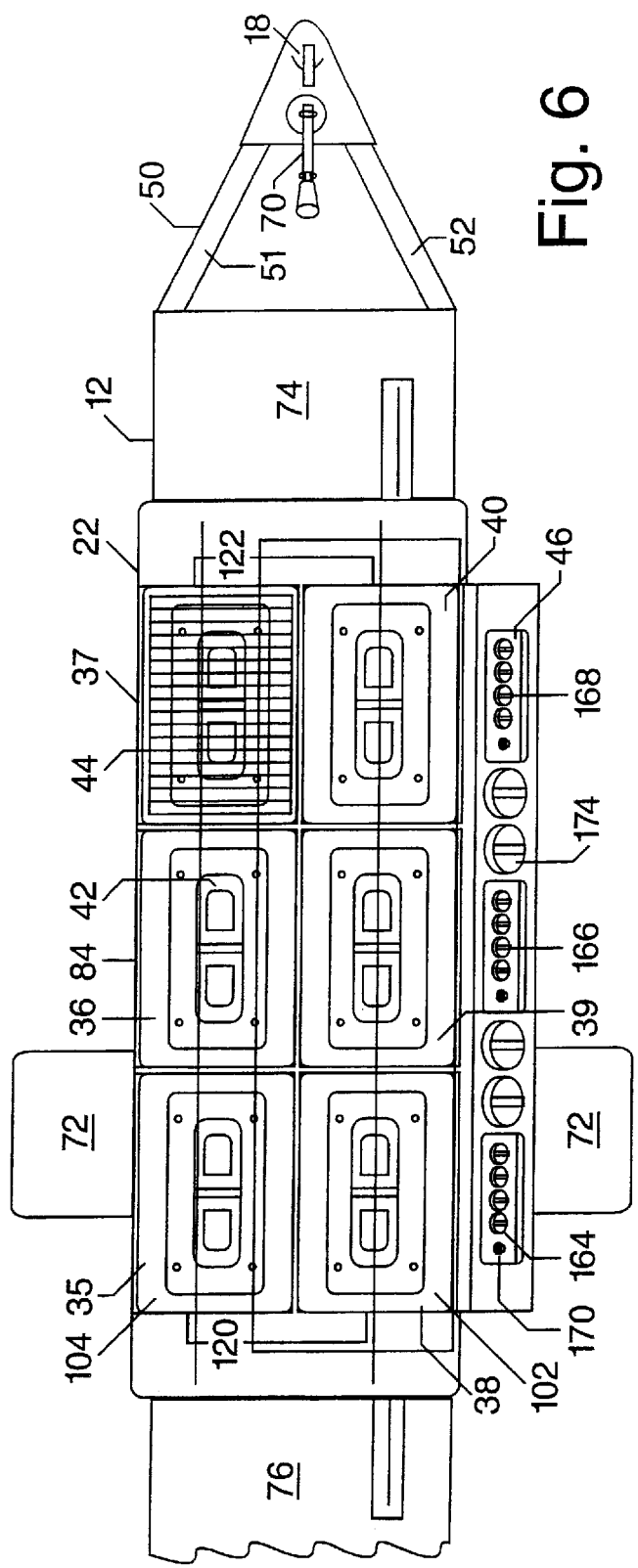
FIG. 6 is a top view of the cooking apparatus with the hood of the main housing removed for sake of illustration.

As can be seen clearly from FIG. 6, fixedly mounted in the main housing 22 are a plurality of smaller housings 35 to 40, each containing at least one gas burner 42 and preferably two burners 42 (as shown). Each smaller housing is provided with at least one grill member 44, only one of which is shown in FIG. 6 for ease of illustration. It is also possible to provide each smaller housing with two or three grill members. The grill member or members are mounted on a top section of the smaller housing a suitable distance above the gas burner 42. The preferred cooking apparatus also comes equipped with a burner control system indicated generally at 46 for operating the gas burners and controlling flow of fuel gas to these burners.

Turning now to the preferred, illustrated support frame 12, the frame can include a forwardly extending tongue 50 comprising two steel frame members 51, 52 that angle inwardly towards the central axis of the trailer (see FIG. 6). The rear ends of these two members are rigidly connected to a rectangular frame section 54. Mounted on this rectangular frame section is a box-like metal cabinet 56 which can house a large, gas containing cylinder 58 shown in dashed lines in FIG. 8. Ready access to the cylinder can be gained through a pivotable door 60 located on one side of the cabinet. In order that gas will not be trapped in the cabinet, in the event that the cylinder 58 should leak, for example, the bottom of the cabinet 56 is preferably constructed of a sturdy metal screen material (not shown) that will also protect the cylinder and other contents of the cabinet from possible damage during transport of the cooking apparatus. Also, preferably there is mounted at the front of the tongue a support wheel mechanism 62 that includes a relatively small support wheel 64 mounted on a vertical shaft 66 that extends into vertically extending cylinder 68. In a well known manner, it will be understood that the wheel 64 can be raised or lowered by means of a hand crank 70. As such manually operated support wheels are well known in trailers of various sorts, a detailed explanation herein is deemed unnecessary.

Rigidly mounted on outwardly extending arms 71 of the support frame are two semi-cylindrical wheel covers 72 that extend over the wheels 20. The wheels 20 are, of course, mounted on a horizontal axle (not shown) that is suitably connected to the support frame 12.

An optional, preferred feature of the illustrated cooking apparatus are front and rear shelves 74 and 76 which can be used to support food trays, for example. Also, at the rear end of the rear shelf there can be provided a rear bumper 78 on which can be mounted a trailer license, if required.

Turning now to the construction of the main housing 22, the preferred metal housing, in addition to the aforementioned side walls and end walls, also has an iron or steel bottom at 80 and it is this bottom that can be rigidly attached directly or indirectly to the support frame 12. The end walls 28 and 30 are substantially smaller than the longitudinally extending side walls 24, 26 and, as shown, these end walls are more steeply sloped than the side walls. The rear end wall 28 is disposed towards the rear end of the support frame and borders the aforementioned rear shelf 76 while the end wall 30 is disposed towards the front end of the support frame and extends upwardly from the front shelf 74. The main side walls 24, 26 (as well as the aforementioned end walls) each have an upper edge. In particular, the main side wall 24 has a first upper edge 82 while the opposite side wall 26 has a second upper edge 84 which is visible in FIG. 6. As can be seen from FIG. 4, the first upper edge 82 is substantially lower than the second upper edge 84 and it is of course desirable that the edge 82 not be too high as the cook or cooks who are using this barbecue apparatus will be working adjacent to this edge where they have ready access to the burner controls. The shape of the front end wall 30 can be seen in FIG. 4 and it will be seen that its upper edge has in effect two levels, a lower level 86 that extends rearwardly from the edge 82 and a higher level 88. On the upwardly projecting section of the end walls, the main hood 32 is pivotably mounted by means of pivot pins 90.

Figure 4:
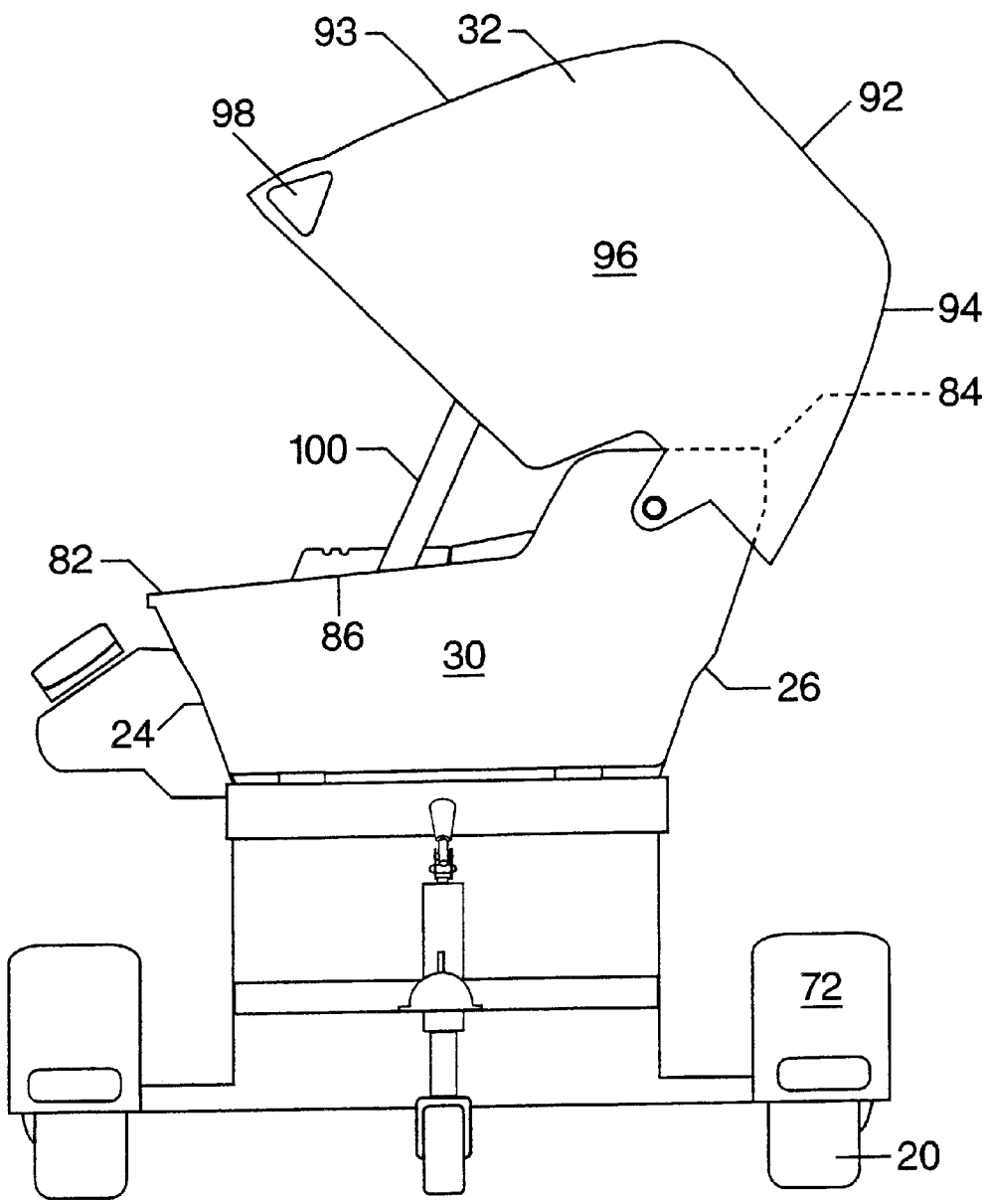
FIG. 4 is a front view of the cooking apparatus, this view showing the hood in the raised position.
Figure 5:
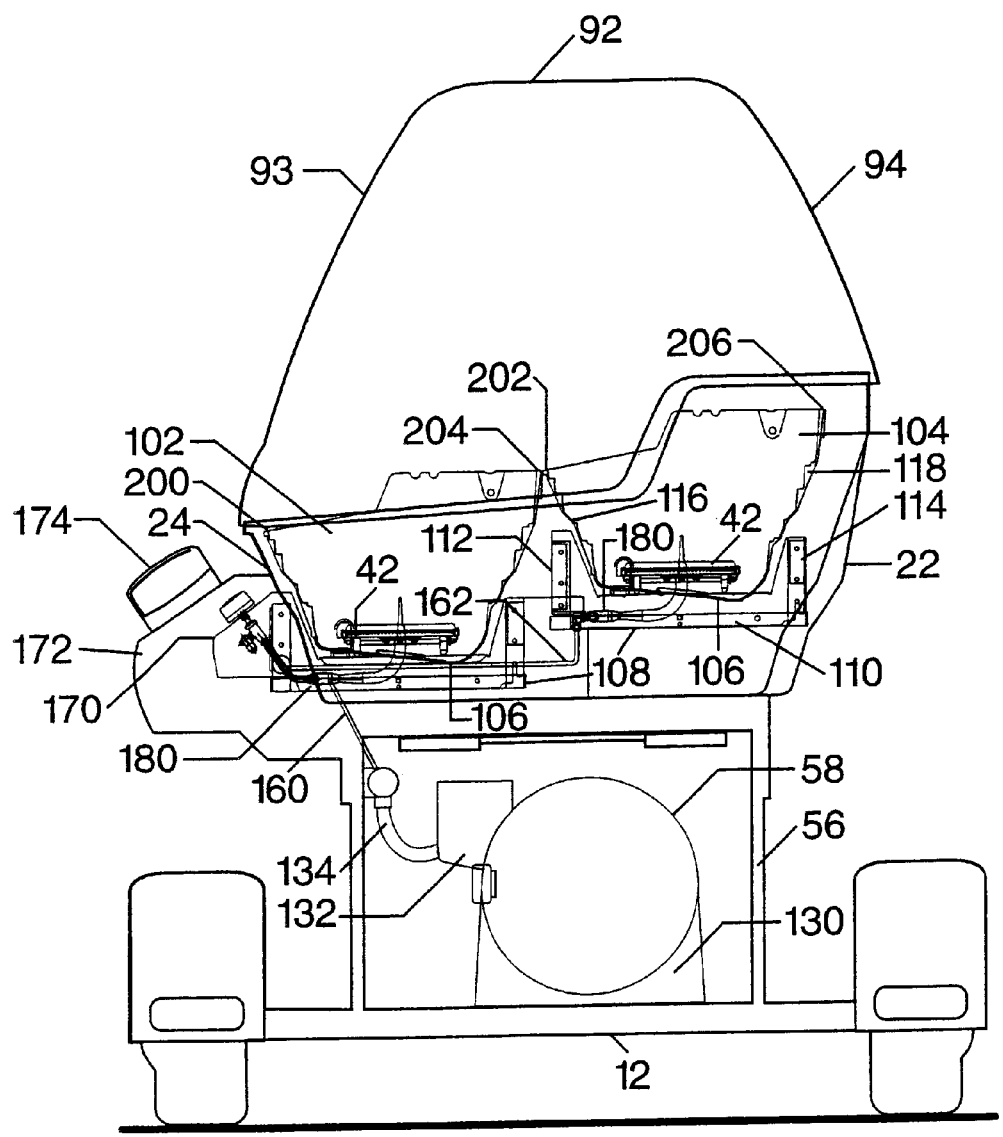
FIG. 5 is a cross-sectional elevation, this view being taken along the line V—V of FIG. 2.

Turning now to the construction of the main hood which can either be considered part of the main housing, or a separate component, this hood can be made of the same, rigid metal as the lower section of the housing, for example, cast iron or steel. The open position of the hood is shown in FIGS. 3 and 4 and the hood is often placed in this position for cooking. The closed position of the hood is illustrated in FIGS. 1, 2 and 5 and the hood would normally be placed in this position for transport of the barbecue. As can be seen from FIGS. 1 and 2, when the hood is in the closed position it covers preferably the open top of the main housing 22. The preferred illustrated hood has a top 92 (which is horizontal when the hood is in the closed position) and two opposing longitudinal side walls 93, 94 that slope downwardly and outwardly from the top of the hood and that can be integrally formed with the top of the hood, if desired. The hood also has two opposing end walls 96, 97 that extend downwardly from the top of the hood. Again, as can be seen from the figures, the end walls can be more steeply sloped (so that they are close to vertical) than the side walls of the hood. If desired, handle bars 98 can be mounted at opposite ends of the hood with the illustrated bars being triangular in cross-section. These can be used to raise and lower the hood. Also, in order to hold the large hood in the open position, adjustable support bars 100 can be mounted within the housing and within the hood, one of these bars being visible in FIG. 4. As shown in FIG. 3, there are preferably two of the bars 100, one adjacent the front end of the hood and the other adjacent to the rear end of the hood. It will be understood that in one version of the hood, each bar 100 can be disconnected at at least one end so as to permit the hood to be moved to the closed position.

Turning now to the preferred construction of the smaller housings 35 to 40, as illustrated in FIG. 6, these housings are preferably arranged in two longitudinally extending rows which can be identified as a front row 102 (the row closest to the control knobs that are part of the aforementioned burner control system) and a rear row 104. In the illustrated preferred embodiment, there are in fact three smaller housings or three separate cooking units in each row. It will be appreciated that there could be as few as two or more than three, if desired. Preferably also the smaller housings 35 to 37 that are in the rear row 104 are mounted at a higher level than the housings 38 to 40 in the front row 102. The higher level of the rear row 104 can be seen clearly in FIG. 5. The front row is located closest to the main side wall 24 of the main housing 22.

Each of the smaller housings preferably has a flat, horizontally extending bottom 106 visible in FIG. 5 and this bottom is rigidly attached to a suitable supporting framework 108, also visible in FIG. 5. This frame work is rigidly mounted on the inside of the main housing and it can include horizontally extending frame members 110 and front and rear upwardly projecting frame members 112 and 114. Each smaller housing also has vertically extending, opposite side walls 116, 118 and vertically extending, opposite end walls 120, 122 that rigidly connect the side walls together. The end walls 120, 122 are visible in FIG. 6. Preferably all of the smaller housings are made in the same or similar manner and in fact, in a particularly preferred embodiment, these smaller housings are the same as the main portions of the housings used in standard, domestic barbecues. In this way, the smaller housings 35 to 40 need not be custom made for purposes of the present cooking apparatus but can be readily acquired from existing barbecue manufacturers at a very reasonable cost. The same comments also apply to the gas burners 42 that are mounted in these smaller housings. As visible in FIG. 5, each burner 42 rests on the bottom 106 of the smaller housing and, in fact, is attached thereto by suitable screws (not shown).

Figure 7:
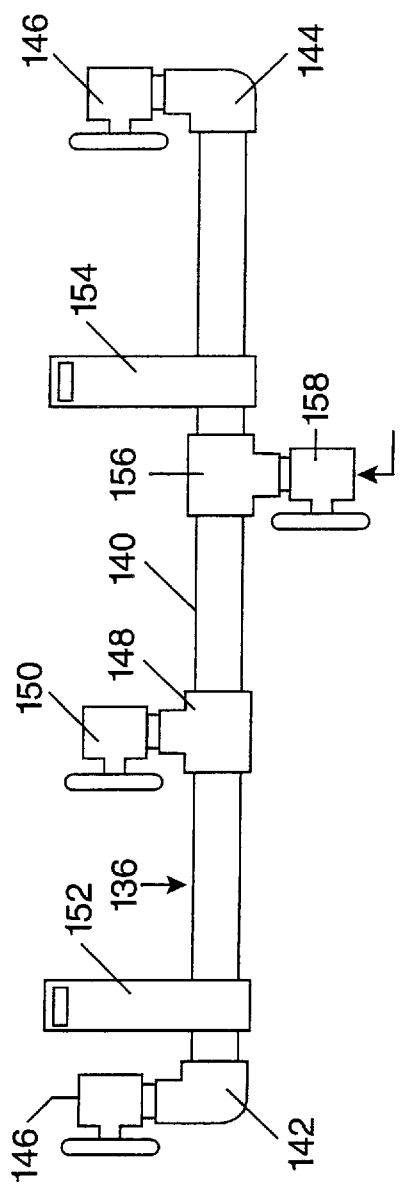
FIG. 7 is a side view of the gas manifold used in the cooking apparatus.

FIGS. 5 and 7 illustrate a preferred form of gas supply system for providing a fuel gas, ie. propane, to the gas burners. The fuel gas supply includes an elongate, cylindrical tank 58 that is rigidly mounted within the metal cabinet 56. At least two or three metal support brackets can extend downwardly from the tank and are attached to the support frame 12. In one preferred embodiment, the size of the tank is forty gallons. A suitable, known cut-off valve can be mounted on the tank at 132. Attached to this valve is a short hose 134 which extends upwardly to an elongate gas manifold 136, the construction of which is shown in some detail in FIG. 7. The main horizontal pipe 140 for the manifold can be ¾ inch pipe and, in one preferred embodiment, the length of the manifold is about five feet. Attached to each end of the pipe 140 is a 90° elbow 142, 144 and attached to each of these elbows is a gas control valve 146. It will be appreciated that the control valve 146 on the left side on FIG. 7 controls the flow of gas to the burners in the housings 35 and 38, while the right hand control valve 146 controls the flow of gas to the burners in the housings 37 and 40. A T-shaped connector 148 located in the central region of the manifold connects the pipe to another gas valve 150 which controls the flow of gas to the burners in the central housings 36 and 39. The main pipe 140 is supported in or on the cabinet by means of two upwardly extending pipe supports 152, 154. Another T-shaped pipe connector 156 connects the pipe 140 to a main control valve 158 which is connected to the tank by means of the hose 134 (shown in FIG. 5). It will be appreciated that additional, smaller gas supply pipes extend up from the manifold of FIG. 7 to the individual burners 42. Two of these smaller pipes can be seen at 160 and 162 in FIG. 5. As these pipes are of standard construction and are commonly used in known domestic barbecues, a detailed description herein is deemed unnecessary.

The actual burner control system 46 includes a plurality of standard, rotatable control knobs 164, 166 and 168. These are arranged in groups of four on a control panel 170 as shown in FIG. 6. These control knobs can operate in a known manner for barbecue controls and they control the flow of the gas fuel to the individual burners. If desired, the actual control panel 170 can be surrounded by an exterior cover 172 on which can be mounted decorative, no-functioning knobs 174. The purpose of these decorative knobs is to give the present cooking apparatus 10 the appearance of a very large, standard, domestic barbecue. These decorative knobs can be made of a suitable, durable plastic and can be made either rotatable or non-rotatable as desired.

It will be understood that the gas supply system includes the usual air intake devices in mixing the required air for combustion with the fuel gas. In particular, air can be drawn into the gas stream by means of a standard air mixing device indicated at 180 in FIG. 5. These devices are mounted outside of each of the smaller housings 35 to 40. It will also be understood that the gas burners 42 can be of standard construction.

The preferred arrangement for the six smaller housings 35 to 40 is illustrated in FIGS. 5 and 6. As can be seen in FIG. 5, each smaller housing has a side wall 116 that can be described as the front wall as it faces towards the side of the apparatus 10 having the burner control system and it is this side on which the cook or cooks will stand to do the required cooking or barbecuing. The opposing side wall 118 can be considered the rear side wall. Preferably, the front side walls 116 of all of the smaller housings are disposed towards one of the main side walls of the main housing which, in the illustrated embodiment, is the side wall 24. It will be further noted that the front side wall 116 of each smaller housing has a top edge indicated at 200 and 202 which is lower than a top edge 204, 206 of the rear side wall 118 of the same smaller housing. As shown in FIG. 5, the top edge 200 of the front row of the smaller housings is close to the top edge of the side wall 24 of the main housing. Preferably, the top edge 202 of each of the rear smaller housings is close to or at the rear top edge 204 of the adjacent front housing. In this way, there can be a smooth transition between a rear grill mounted at the rear and top of the front smaller housing and a front grill mounted at the top of the rear smaller housing and this can be helpful for cooking.

Figure 8:
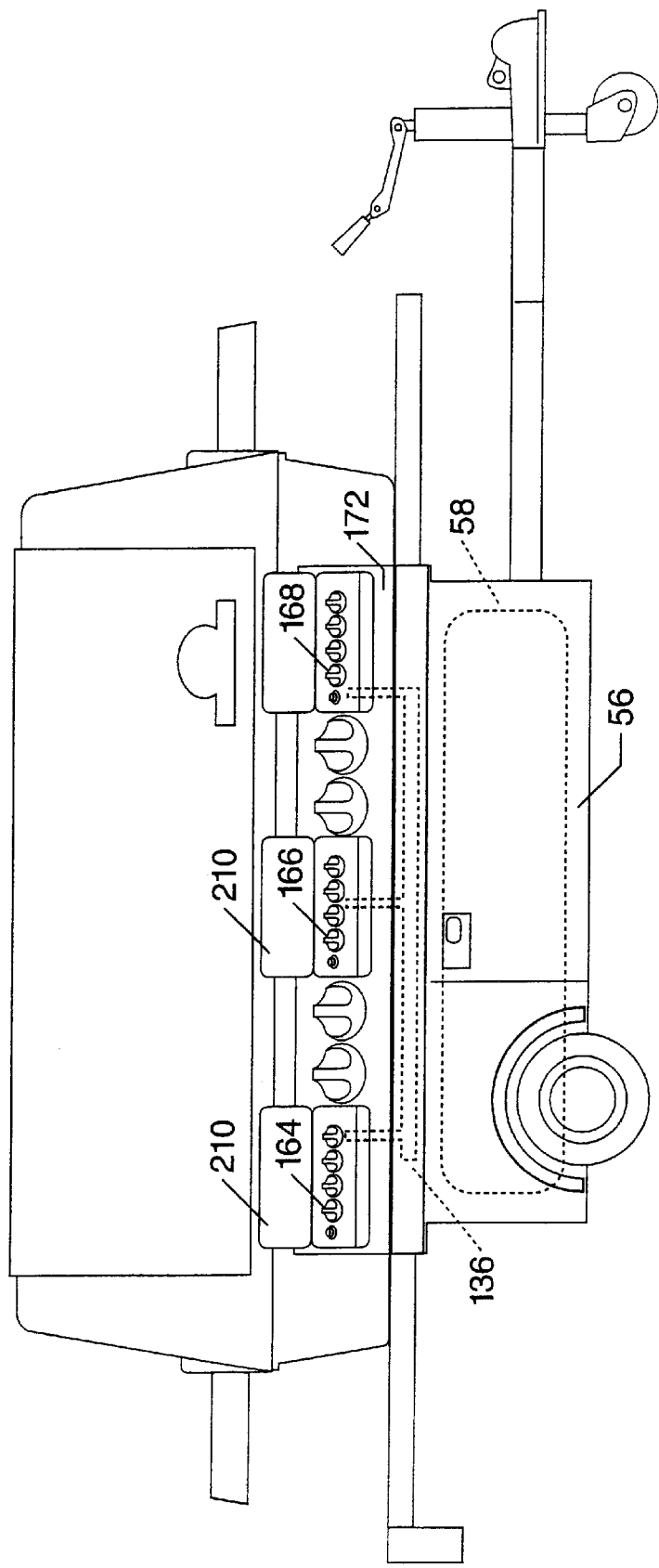
FIG. 8 is the right side elevation similar to FIG. 2 with the front hitch mechanism omitted for ease of illustration and with some of the gas supply components illustrated in dashed lines.

Preferably the control knobs 164, 166, and 168 when not in use can be covered by small, hinged panels 210 which can be seen in the closed position in FIG. 2. These panels can be swung upwardly to reveal the gas control knobs. The panels can be mounted on the exterior cover 172. FIG. 8 illustrates these panels 210 in the raised position.

It will be seen from the above description and the drawings that the cooking apparatus of the present invention can be used to carry out a large cooking operation in an outdoor environment. The apparatus can be made completely portable and can be readily towed behind another vehicle such as a pick-up truck. It is also possible to construct a cooking apparatus embodying aspects of the invention that is not mounted on wheels or that is not constructed as a pull-type trailer. For instance, a cooking apparatus of the invention may still be movable although not mounted on wheels. It could be mounted on skids or simply on upstanding legs and moved by means of a fork-lift truck or crane. It is also possible to construct an embodiment of the invention that is permanently installed at a selected location and is not meant to be moved.

The present apparatus can be fitted with its own supply of fuel gas. The preferred portable cooking apparatus has a unique and pleasing appearance that makes it particularly desirable for promotional events by larger companies and organizations. As will be clear from the drawings, the preferred form of the cooking apparatus has an appearance somewhat similar to a standard, domestic gas barbecue although, of course, it is much larger in size.

It will be readily apparent to those skilled in the construction of cooking and barbecuing equipment that various modifications and changes can be made to the cooking apparatus described herein without departing from the spirit and scope of this invention. Accordingly, all such modifications and changes as fall within the scope of the appended claims are intended to be included within the scope of this invention.

I claim:

1. A portable cooking apparatus comprising:
   a longitudinal extending support frame having a rear end and a front end,
   a tow hitch mechanism mounted on said front end;
   ground engaging wheels rotatably mounted on opposite longitudinal sides of said support frame;
   a main housing provided with vertically extending main side walls and mounted on said support frame;
   a plurality of smaller housings each containing at least one gas burner and each having a bottom, vertically extending opposite side walls, and vertically extending, opposite end walls, each smaller housing being provided with at least one grill member mounted above the at least one gas burner of the respective housing, said smaller housings being fixedly mounted in said main housing;
   a gas supply system for providing fuel gas to the gas burners; and
   a burner control system for operating said gas burners and controlling flow of said fuel gas to said gas burners.

2. A portable cooking apparatus according to claim 1 wherein said smaller housings are arranged in two longitudinally extending rows with at least two of said smaller housings in each row.

3. A portable cooking apparatus according to claim 2 including a main hood mounted on said main housing and pivotable between an open position used for cooking and a closed position, said main hood in said closed position covering an open top of the main housing.

4. A portable cooking apparatus according to claim 2 wherein said side walls of each smaller housing include a front side wall and a rear side wall and the front side walls of all the smaller housings are disposed towards one of the main side walls of said main housing.

5. A portable cooking apparatus according to claim 4 wherein the smaller housings in one of said rows are mounted at a higher level than the smaller housings in the other of said rows and the latter row is located closest to said one main side wall.

6. A portable cooking apparatus according to claim 5 wherein said front side wall of each smaller housing has a top edge which is lower than a top edge of the rear side wall of the same smaller housing.

7. A portable cooking apparatus according to claim 4 wherein there are three of said small housings in each row.

8. A portable cooking apparatus according to claim 2 wherein said main housing includes a bottom and two opposing main end walls extending between and connecting said main side walls, one of said main end walls being disposed towards said rear end of the support frame and the other of said main end walls being disposed towards said front end of the support frame.

9. A portable cooking apparatus according to claim 7 wherein said main side walls include first and second longitudinally extending main side walls having first and second upper edges respectively, said first upper edge is substantially lower than said second upper edge, and said burner control system is located along said first main side wall.

10. A portable cooking apparatus according to claim 3 wherein said main hood has a top, two opposing longitudinal side walls that slope downwardly and outwardly from said top of the hood, and two opposing end walls that extend downwardly from said top of said hood.

11. A cooking apparatus for cooking food with a fuel gas such as propane, said apparatus comprising:
    a support arrangement for supporting the apparatus on the ground or other support surface;
    a main housing mounted on said support arrangement, said main housing including main side walls that extend vertically;
    a plurality of cooking units mounted in said main housing, each cooking unit comprising a smaller housing having an open top, at least one gas burner mounted in said smaller housing, and at least one grill member mounted on said smaller housing above said at least one gas burner, each smaller housing having a bottom, vertically extending opposite side walls, and vertically extending, opposite end walls connecting said side walls of the smaller housing; and
    a gas supply system for providing fuel gas to the gas burners.

12. A cooking apparatus according to claim 11 wherein said cooking units are arranged in two longitudinally extending rows with at least two of the smaller housings in each row.

13. A cooking apparatus according to claim 12 including a main hood mounted on said main housing and pivotable between an open position used for cooking and a closed position, said main hood in said closed position covering an open top of the main housing.

14. A cooking apparatus according to claim 12 wherein said side walls of each smaller housing include a front side wall and a rear side wall, which is higher than the front side wall, and the front side walls of all the smaller housings are disposed towards one of the main side walls of the main housing.

15. A cooking apparatus according to claim 12 wherein the cooking units in one of said rows are mounted at a higher level than the cooking units in the other row, said gas supply system includes gas flow controls located along one of said main side walls, and said other row of cooking units is disposed adjacent to said one main side wall.

16. A movable gas cooking apparatus comprising:
- a supporting frame having two, opposite longitudinal sides, a front end, and a rear end;
- ground engaging wheels rotatably mounted on opposite sides of said supporting frame;
- a housing including a lower section having vertically extending, opposing side walls, vertically extending, opposing end walls, and an open top, and a housing lid pivotable between open and closed positions and extending over said lower section;
- a plurality of separate cooking units mounted in two longitudinal rows in said housing, all of said cooking units being oriented so that a front side of each cooking unit faces towards the same side wall of the housing, each cooking unit including an open-topped enclosure, at least one gas burner mounted in said enclosure, and at least one grill member mounted above said at least one gas burner; and
- a gas supply system for providing a fuel gas to the gas burners.

17. A movable gas cooking apparatus according to claim 16 wherein the cooking units in one row, including their respective enclosures, are mounted at a higher level than the cooking units and enclosures in the other row and the other row is located closest to said same side wall of the housing.

18. A movable gas cooking apparatus according to claim 17 wherein there are at least three cooking units in each row and each enclosure has vertically extending, opposite enclosure side walls, and vertically extending, opposite end walls that connect together said enclosure side walls.

19. A movable gas cooking apparatus according to claim 17 wherein said housing lid has a top, two opposing longitudinal side walls that slope downwardly and outwardly from said top of the lid, and two opposing end walls that extend downwardly from said top of the lid.

20. A movable gas cooking apparatus according to claim 16 including a tow hitch mechanism mounted at said front end of the supporting frame and a burner control system for operating said gas burners and controlling flow of said fuel gas in said gas burners, said burner control system being located at said same side wall of the housing.

* * * * *